(12) United States Patent
Bell

(10) Patent No.: US 6,672,173 B2
(45) Date of Patent: Jan. 6, 2004

(54) FLOW METER

(76) Inventor: Joel David Bell, 1167 Barkston Dr., Katy, TX (US) 77450

( * ) Notice: Subject to any disclaimer, the term of this patent is extended or adjusted under 35 U.S.C. 154(b) by 0 days.

(21) Appl. No.: 10/164,011

(22) Filed: Jun. 6, 2002

(65) Prior Publication Data

US 2003/0226405 A1 Dec. 11, 2003

(51) Int. Cl.[7] ................................................ G01F 1/37
(52) U.S. Cl. .................................................... 73/861.52
(58) Field of Search ........................ 73/861.63, 861.61, 73/863.81, 861.52; 137/884

(56) References Cited

U.S. PATENT DOCUMENTS

| | | | |
|---|---|---|---|
| 4,237,739 A | 12/1980 | Owen et al. | 73/861.63 |
| 4,926,698 A | * 5/1990 | Owen | 73/861.61 |
| 5,458,006 A | * 10/1995 | Roqueta | 73/861.42 |
| 5,463,908 A | * 11/1995 | Rosolia | 73/863.83 |
| 5,803,123 A | 9/1998 | Bell et al. | 137/884 |
| 5,848,607 A | 12/1998 | Bell et al. | 137/597 |

* cited by examiner

Primary Examiner—Edward Lefkowitz
Assistant Examiner—Jewel Thompson

(57) ABSTRACT

A flow meter for measuring the volume of fluid flowing through the meter includes an inner cylindrical tube through which the fluid flows and an outer cylindrical tube tending over the inner cylindrical tube. The outer cylindrical tube is radially spaced from the cylindrical inner tube to provide an annular cylindrical space between the inner cylindrical tube and the outer cylindrical tube. A seal between said inner cylindrical tube and the outer cylindrical tube closes the annular cylindrical space adjacent ends of the annular cylindrical space. The inner cylindrical tube further defines at least one opening in a wall of the inner cylindrical tube to balance the fluid pressure in the annular cylindrical space with the pressure in the inner cylindrical tube. A flow restriction member is mounted to an inner surface of said inner cylindrical tube for restricting the flow of fluid through the inner cylindrical tube and produces a pressure drop in the fluid as it flows past the flow restriction member. The inner cylindrical tube and the outer cylindrical tube in combination further define at least one port for receiving a pressure sensing device to measure the pressure of the fluid flowing through said flow meter.

27 Claims, 3 Drawing Sheets

FLOW METER

FIELD OF THE INVENTION

The present invention relates to flow meters in general, and in particular to flow meters that employ a wedge-shaped flow restricting element producing a pressure drop within the flow meter to indicate the volume of fluid flowing through the flow meter.

BACKGROUND OF THE INVENTION

The use of wedges to create a pressure drop in flow meters for measurement of the volume of fluid passing through a flow meter is known in the art. Wedge-shaped flow meters are described in U.S. Pat. No. 4,237,739 issued on Dec. 9, 1980, and U.S. Pat. No. 4,926,698 issued on May 22, 1990. The '739 patent describes a flow meter using a single wedge affixed to the internal wall of the flow meter whereas the '698 patent describes a flow meter having two opposing wedges mounted on opposite sides of the flow meter interior wall. Either arrangement creates an opening within the flow meter having a reduced cross-sectional area in the flow-path of the fluid thereby creating a pressure differential on opposite sides of the wedge or wedges. The pressure differential created on opposite sides of the wedges has a known mathematical relationship to the flow rate of the fluid passing there through, and as long as the cross-sectional area of the opening at the wedge is constant, the fluid flow measurements are very accurate.

FIG. 1 shows a typical prior art flow meter 10 shown in cross-section. Flow meter 10 generally comprises a tubular housing 12 having a longitudinal passageway 14 in which a wedge-shaped member 16 is affixed to the inner wall 18 of housing 12 thereby creating at apex 20 of wedge 16 a restricted cross-sectional area represented by dimension D. At least two ports 22 are defined by housing 12. One of ports 22 is positioned upstream from wedge 16 and the other of ports 22 is positioned downstream from wedge 16. Ports 22 are in fluid communication with the interior flow through passage 14 thereby permitting the detection of the pressure differential induced by wedge 16 restricting fluid flow through flow meter 10.

Nevertheless, fluid flow conditions under which the flow meters are used are variable and tend to change. Specifically, temperature changes and changes in the pressure of the fluid being measured cause the diameter of the passageway through the flow meter to expand and contract. Consequently, the cross-sectional area between the wedge apex and the flow meter wall opposite the wedge does not remain constant. Small changes in the flow meter passageway diameter or the distance between the wedge apex and the wall opposite from the wedge can make substantial changes in the pressure drop of the fluid flowing past the wedge. Consequently, these changes introduce unwanted errors in the calculated volume of fluid flowing through the meter.

Thus, there is a need within the industry for a wedge-type flow meter where changes in the pressure and temperature of the fluid being measured by the flow meter will minimally affect the cross-sectional area of the restricted opening at the wedge. Such a flow meter will thereby provide improved accuracy in the measurement of the volume of fluid flowing through the meter.

SUMMARY OF THE INVENTION

One aspect of the present invention is a flow meter for measuring the volume of fluid flowing through the meter which includes an inner cylindrical tube through which the fluid flows and an outer cylindrical tube tending over the inner cylindrical tube. The outer cylindrical tube is radially spaced from the cylindrical inner tube to provide an annular cylindrical space between the inner cylindrical tube and the outer cylindrical tube. A seal between said inner cylindrical tube and the outer cylindrical tube closes the annular cylindrical space adjacent the ends of the annular cylindrical space. The inner cylindrical tube allows fluid pressure to enter the radial space between the inner cylindrical tube and the outer cylindrical tube through a surface opening opposite the sealed end of the inner cylindrical tube to provide pressure balancing between the pressure in the annular cylindrical space and the pressure in the inner cylindrical tube. A flow restriction member is mounted to an inner surface of said inner cylindrical tube for restricting the flow of fluid through the inner cylindrical tube and produces a pressure drop in the fluid as it flows past the flow restriction member. The inner cylindrical tube and the outer cylindrical tube in combination further define at least two ports for receiving a pressure sensing device to measure the pressure of the fluid flowing through said flow meter.

Another aspect of the present invention is a fluid flow meter for measuring the volume of fluid flowing through a passageway. The meter includes an outer housing having a first internal bore, and a removable inner member telescopically received in the first internal bore. The first internal bore and an outer surface of the inner member in combination define a cannular space therebetween wherein the cannular space is isolated from fluid flowing there through. The inner member has a second internal bore of a first predefined cross-sectional area to accommodate the fluid flow there through and is in pressure equalizing communication with the cannular space. A metering structure is mounted within the second internal bore for measuring the fluid flow there through.

Yet another aspect of the invention is a method for measuring the flow of a fluid through a tube. The method comprises the steps of providing an outer housing having an internal bore, and providing a calibrated tubular flow metering device having a flow restrictor mounted therein. The flow metering device is inserted within the outer housing internal bore in a telescoping fashion to create a cannular space between the outer housing and the metering device. The pressure of the cannular space is equalized with the internal pressure of the flow metering device. The combined outer housing and calibrated tubular flow metering device are coupled in the flow path of a fluid, and the pressure differential on each side of the flow restrictor is then measured.

These and other advantages of the invention will be further understood and appreciated by those skilled in the art by reference to the following written specification, claims and appended drawings.

DESCRIPTION OF THE PREFERRED EMBODIMENT

Figure 1:
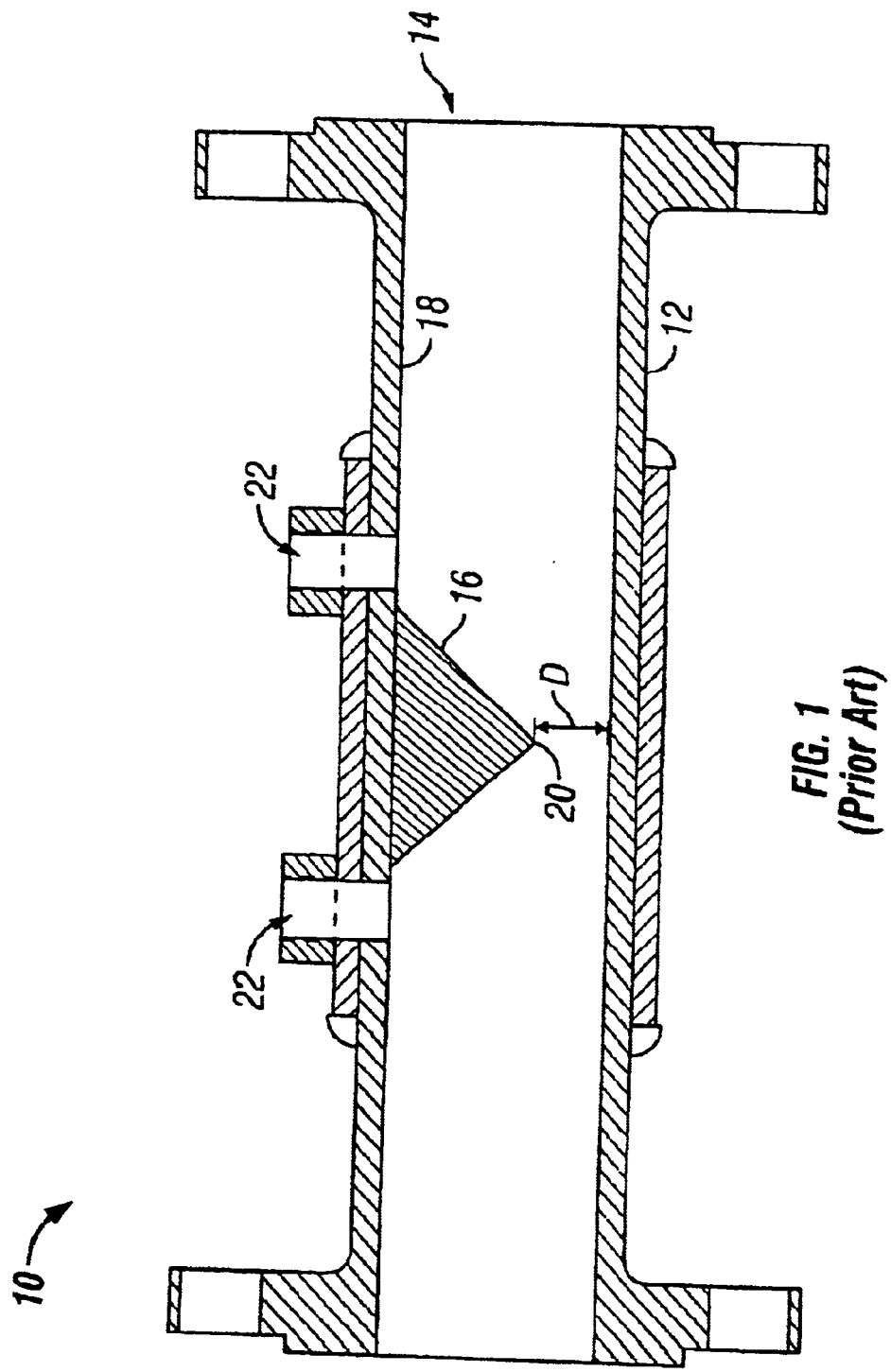
FIG. 1 is a prior art flow meter incorporating an internal wedge to restrict the fluid flow.
Figure 2:
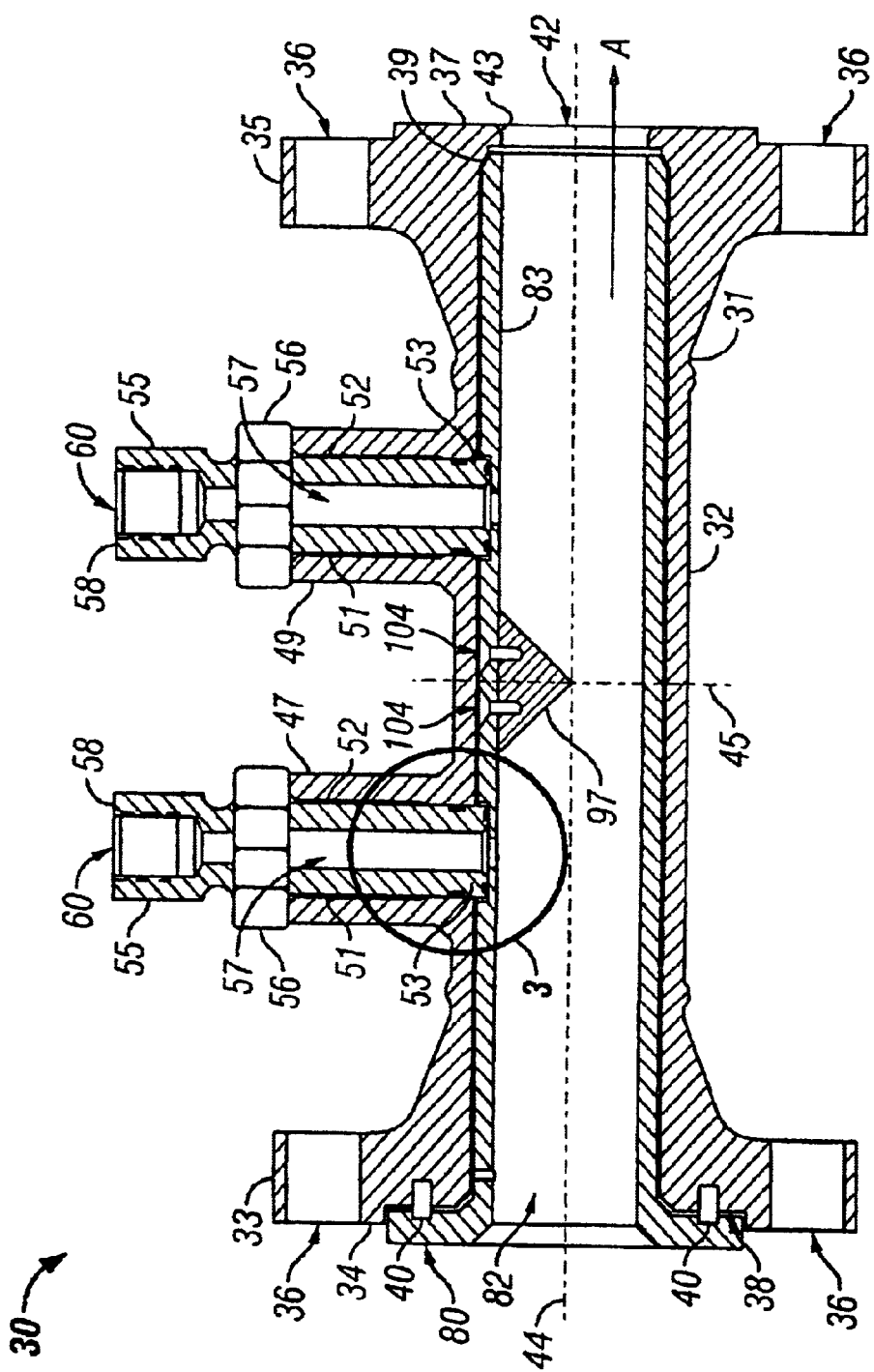
FIG. 2 is a cross-sectional view, shown along a horizontal center line of a fluid flow meter embodying the present invention.

For purposes of description herein, the terms "upper", "lower", "right", "left", "rear", "front", "vertical", "horizontal" and derivatives thereof shall relate to the invention as oriented in FIG. 2. However, it is to be understood that the invention may assume various alternative orientations and step sequences, unless it is expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
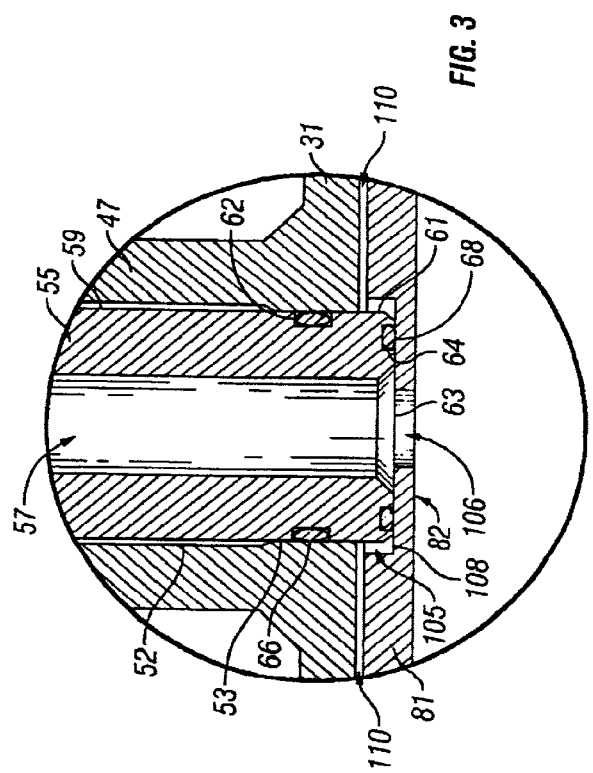
FIG. 3 is a cross-sectional view of the circular area III of FIG. 2 taken at the location where the hollow core bolt interfaces with the calibrated tube.
Figure 4:
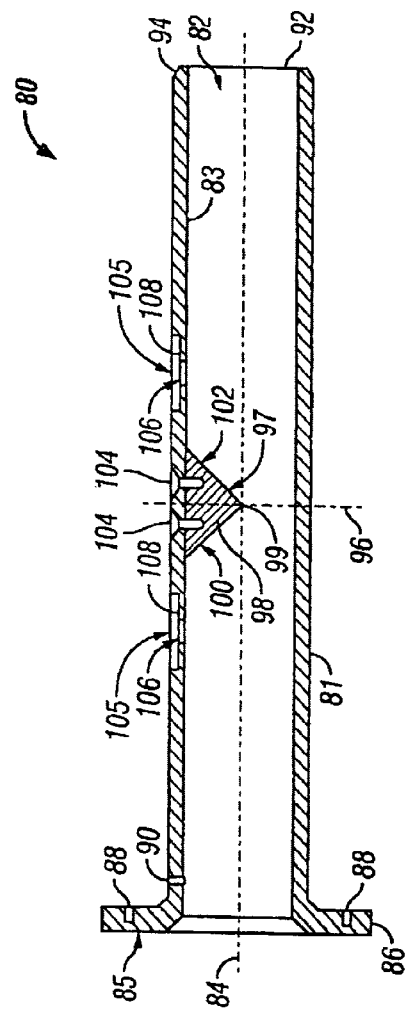
FIG. 4 is a cross-sectional view of the calibrated tube taken along the horizontal center line.

Turning to the drawings, FIGS. 2 to 4 show a flow meter 30, which is one of the preferred embodiments of the present invention, and illustrates its various components.

A preferred embodiment of flow meter 30, as shown in FIG. 2, comprises a housing 31 which receives therein an inner member 80. Inner member 80 has a central bore 82 through which a fluid flows in a direction indicated by arrow "A". Although the fluid in FIG. 2 is shown as flowing in direction "A", this is for illustration purposes only, and those skilled in the art will recognize that the various possible embodiments permit accurate metering of fluid flowing in either direction through flow meter 30. Flow meter 30 can be installed in either a 'forward' or 'reverse' orientation with no effect on the accuracy or operation of the flow meter. A flow restrictor 97 is positioned internally to inner member 80 and forms part of a metering structure. First and second port connections 47 and 49 respectively are equidistantly spaced from flow restrictor 97. First port connection 47 is positioned upstream from flow restrictor 97 and second port connection 49 is positioned downstream from flow restrictor 97.

As illustrated in FIG. 2, housing 31 generally comprises a tubular body 32 having a flange 33 at a first end 34 thereof and a second flange 35 at a second end 37. First and second flanges 33 and 35 have a plurality of attach holes 36 to affix flow meter 30 within a pipeline. Second end 37 is configured in a manner to mate with a tube or a pipe in a fluid transmission system (not shown), and can take on a variety of configurations dependent on the requirements of the fluid transmission system. Housing 31 has an internal bore 42 extending longitudinally therethrough and has a central longitudinal axis 44. Peripheral lip 43 extends radially into internal bore 42 at second end 37 to define a bore opening at second end 37 that is smaller in diameter than bore 42. Peripheral lip 43 has an internal chamfer 39 which substantially faces inwardly from the opening to internal bore 42 at second end 37.

First end 34 of housing 31 has a circular recess 38 machined therein and further includes at least two alignment pins 40 embedded within flange 33 and extending into recess 38. Alignment pins 40 are precision located in a predefined pattern for engagement and positioning of a first end of inner member 80 as further described below.

Flow meter 30 has a vertical center line generally shown by dashed line 45. First and second port connections 47 and 49 respectively are positioned equidistant from centerline 45. Port connections 47 and 49, in the preferred embodiment, are connections that are commercially available and well known in the art. Port connections 47 and 49 are affixed to tubular body 32 by welding to a top portion thereof. Each of port connections 47 and 49 have a vertical bore 51 extending therethrough and are in fluidic communication with internal bore 42. An upper portion 52 of central bore 51 in port connections 47 and 49 are internally threaded while a lower portion 53 is a smooth non-threaded bore and generally of smaller diameter than upper portion 52. Each of port connections 47 and 49 receive therein a hollow core bolt 55.

Referring also to FIG. 3, each hollow core bolt 55 has an upper threaded shank portion 59 and a lower non-threaded shank portion 61. Each bolt 55 is threaded into each of port connections 47 and 49 to a desired depth wherein lower non-threaded shank portion 61 extends into internal bore 42 in a sealing manner with inner member 80 as further described below. Bolts 55 are retained in their vertical position within port connections 47 and 49 by lock nuts 56 engaging a portion of upper threaded shank 59 and bearing against a top of port connections 47 and 49. Bolts 55 also have a head 58 which extends above lock nuts 56. A central bore 57 extends the length of bolt 55 to provide fluid communication with housing internal bore 42. Head 58 further includes a threaded bore 60 for receiving a pressure gauge or a pressure transmission tube for connection to a pressure gauge. Smooth non-threaded shank portion 61 of bolt 55 includes a groove 62 therearound. Groove 62 retains a first O-ring 66 to create a pressure seal between lower smooth portion 53 of central bore 51 in port connections 47 and 49 and lower unthreaded shank 61 of bolt 55. Bottom 63 of bolt 55 defines a second circular groove 64 therein which retains a second O-ring 68 for sealing engagement with inner member 80 as further described below.

FIG. 4 illustrates inner member 80 which generally comprises inner cylindrical tube 81 having a flange 86 at a first end 85. Flange 86 is generally circular in configuration and is sized to be received within circular recess 38 at first end 34 of housing 31. Flange 86 includes alignment pin holes 88 therein in a precision pattern coincident with the pattern of alignment pins 40 in recess 38 of housing 31. Inner cylindrical tube 81 has an inner wall 83 which defines an internal bore 82 extending longitudinally therethrough. Bore 82 has a central longitudinal axis illustrated by dash line 84. Inner cylindrical tube 81 has a pressure equalization hole 90 extending therethrough permitting fluidic communication between internal bore 82 and an exterior of inner cylindrical tube 81. Inner member 80 has a second end 92 which has an external chamfer 94 at second end 37 of housing 31. Chamfer 94 is angularly oriented substantially equal to internal chamfer 39 for engagement therewith.

Inner member 80 has a vertical center line shown by dash line 96. Vertical center line 96 of inner member 80 and vertical center line 45 of housing 31 are substantially coincident when inner member 80 is received into housing 31. A flow restrictor 97 is affixed to inner wall 83 of cylindrical tube 81. In the preferred embodiment, flow restrictor 97 is a wedge 98 having first and second surfaces 100 and 102 respectively. Surfaces 100 and 102 are substantially planar and in combination define an apex 99. Wedge 98 is oriented within cylindrical tube 81 such that apex 99 is substantially perpendicular to both longitudinal axis 84 and vertical axis 96. Wedge 98 is retained to inner wall 83 by threaded fasteners 104 thereby rendering wedge 98 removable and readily replaceable with a wedge of different dimensions or configuration.

Each of wedges 98 are selected such that the height of wedge 98 is represented as the minimum distance from apex 99 to the inner wall 83 of tube 81 as taken along vertical center line 96 and perpendicular to axis 84. The acceptable height range of wedges 98 is such that the ratio of the wedge height to the diameter of internal bore 82 is within the range of 0.2 to 0.5. Those knowledgeable in the art will also realize that opposing wedges 98 can also be utilized to provide the desired flow restriction with substantially the same results as a single wedge as disclosed in the prior art. Each combined wedge 98 and tube 81 can be precalibrated for use in any housing 31 without requiring recalibration of the tube-wedge combination. However, those skilled in the art will also recognize that the replacement of a wedge 98 in a specific tube 81 will require recalibration of the wedge-tube combination.

Cylindrical tube 81 further includes circular recesses 105 at a top portion thereof. Recesses 105 are equally spaced about center line 96 and upon receipt of inner member 80 within housing 31 are in vertical registration with central bores 51 of port connections 47 and 49. Recesses 105 have a circular land 108 and a pressure port 106 extending through land 108 to internal bore 82.

In use, a housing 31 is selected for insertion in a fluid line to measure the fluid flow therethrough. An inner member 80 comprising a specific wedge 98 and tube 81 configuration is selected based upon the type of fluid to be measured and the flow rate to be measured thereby. Inner member 80 is telescopically inserted into first end 34 of housing 31 and aligned so that alignment pins 40 in circular recess 38 are received in alignment pin holes 88 of flange 86. Engagement of pins 40 in holes 88 substantially centers first end 85 with respect to bore 42. Upon full insertion chamfer 94 at second end 92 of inner member 80 is received by internal chamfer 39 of housing 31. The tapered surfaces of chamfers 39 and 94 interact such to center second end 92 inner cylindrical tube 81 within internal bore 82 of housing 31. Flange 86 of inner member 80 is sealed against circular recess 38 and inner cylindrical tube 81 is centered along its length within internal bore 42 of housing 31.

Since the outer diameter of inner cylindrical tube 81 is smaller than bore 42, a space 110 is defined by the outer diameter of tube 81 and inner bore 42 of housing 31. Space 110 is sealed from internal bore 82 of inner member 80 except for pressure equalization hole 90 which permits the fluid pressure within space 110 to be equalized with the pressure of the fluid flowing through internal bore 82. However, because space 110 is otherwise sealed from internal bore 82, there is no fluid flow therethrough. After inner member 80 is received and centered within internal bore 42, hollow core bolts 55 are inserted in first and second port connections 47 and 49. Bolts 55 are threaded down until first O-ring 66 seals the upper portion of bore 51 from the fluid pressure in space 110. Further, bottom 63 of bolt 55 bears against circular land 108 of inner cylindrical tube 81 such that second O-ring 68 seals space 110 from internal bore 82. Lock nuts 56 are used to secure bolts 55 within port connections 47 and 49 to maintain the pressure seals created by O-rings 66 and 68. Pressure gauges or fluid pressure transmission lines (not shown) can be coupled with threaded bore 60 in head 58 of bolt 55 such that when a fluid flows through bore 82, the pressure differential between pressure port 106 at port connection 47 upstream from flow restrictor 97 can be compared with the pressure at pressure port 106 of port connection 49 downstream from flow restrictor 97 in a manner well known in the art to determine the fluid flow rate therethrough. The preferred embodiment permits the measurement of fluid flow in a bi-directional manner without loss of metering accuracy in either direction.

Those skilled in the art will recognize that different flow restrictor sizes, shapes and configurations can be utilized to optimize the fluid flow metering performance of meter 30, and that different quantities of pressure sensing ports can also be utilized as alternate embodiments. Further, in addition to the foregoing description, those skilled in the art will readily appreciate that other modifications may be made to the invention without departing from the concepts disclosed herein. Such modifications are to be considered as included in the following claims, unless these claims expressly state otherwise.

I clam:

1. A flow meter for measuring the volume of fluid flowing through the meter comprising:

an inner cylindrical tube through which the fluid flows;

an outer cylindrical tube tending over said inner cylindrical tube and radially spaced from said cylindrical inner tube to provide an annular cylindrical space between said inner cylindrical tube and said outer cylindrical tube;

a seal between said inner cylindrical tube and said outer cylindrical tube closing said annular cylindrical space adjacent ends of said annular cylindrical space;

said inner cylindrical tube further defining at least one opening in a wall of said inner cylindrical tube to balance the fluid pressure in said annular cylindrical space with the pressure in said inner cylindrical tube;

a flow restriction member mounted to an inner surface of said inner cylindrical tube for restricting the flow of fluid through said inner cylindrical tube and producing a pressure drop in the fluid as it flows past said flow restriction member;

said inner cylindrical tube and said outer cylindrical tube in combination further define at least a a first port for receiving a pressure sensing device to measure the pressure of the fluid through said flow meter;

said outer cylindrical tube has a first flange at a first end thereof, a recess defined within said flange, and at least two alignment pins extending from a surface of said recess; and said inner cylindrical tube has a second flange at a first end thereof, said second flange abutting said first flange within said recess and further having holes receiving said alignment pins therein for centering said inner cylindrical tube within said outer cylindrical tube.

2. The flow meter according to claim 1 wherein:

said outer cylindrical tube has an internal chamfer at a second end thereof;

and said inner cylindrical tube has an external chamfer at chamfer engaging said internal chamfer when said inner cylindrical tube is received within said outer cylindrical tube to center said end of said inner cylindrical tube within said second end of said outer cylinder tube.

3. The flow meter according to claim 1 wherein said flow restriction device is a wedge.

4. The flow meter according to claim 3 wherein said wedge is detachable from said inner cylindrical tube.

5. The flow meter according to claim 4 wherein said wedge is positioned substantially centrally to said first and said second ends.

6. The flow meter according to claim 5 wherein said wedge includes at least one face oriented at an oblique angle to a longitudinal axis of said inner cylindrical tube.

7. The flow meter according to claim 6 wherein said face at least partially defines an apex to said wedge, said apex substantially lying within a plane perpendicular to said longitudinal axis.

8. The flow meter according to claim 7 wherein a height of said wedge is defined as the minimum distance from said apex to said inner surface of said inner cylindrical tube taken along a radial extending from said longitudinal axis to said inner surface and wherein a ratio of said height to a diameter of said inner surface is within the range of 0.2 to 0.5.

9. The flow meter according to claim 5 wherein said first port is positioned a predefined distance from said wedge as measured along a longitudinal axis of said inner cylindrical tube.

10. The flow meter according to claim 9 wherein said first port comprises:

a port connection on said outer cylindrical tube having a partially threaded bore in fluid communication with an interior of said outer cylindrical tube; a circular land on an exterior of said inner cylindrical tube, said land further defining and aperture therethrough in fluid communication with an interior of said inner cylindrical tube;

a hollow core bolt having a central bore therethrough, said bolt received within said partially threaded bore and a bottom portion thereof abutted to said land; and a seal isolating said central bore from said annular cylindrical space for transmitting fluid pressure from said inner cylindrical tube through said central bore.

11. The flow meter according to claim 10 wherein said inner cylindrical tube and said outer cylindrical tube in combination define at least two ports for receiving a pressure sensing device.

12. The flow meter according to claim 11 therein at least a first of said ports is positioned at an upstream area of said flow meter from said wedge, and at least a second of said ports is positioned at a downstream area of said flow meter.

13. The flow meter according to claim 12 wherein said first and said second ports are equally spaced along said longitudinal axis from said wedge.

14. A flow meter for measuring the volume of fluid flowing through a passageway, said meter comprising:

an outer housing having a first internal bore;

a removable inner member telescopically received in said first internal bore and suspended therein, said first internal bore and an outer surface of said inner member in combination defining a space therebetween, said space isolated from fluid flowing therethrough;

said inner member having a second internal bore of a first predefined cross-sectional area to accommodate the flow therethrough, said internal bore in pressure equalizing communication with said space;

a metering structure within said second internal bore for measuring the fluid flow therethrough;

said outer housing has a first flange at a first end thereof, a recess defined within said flange, and at least two alignment pins extending from a surface of said recess; and said inner member has a second flange at a first end thereof, said second flange abutting said first flange within said recess and further having holes receiving said alignment pins therein for centering said inner member within said bore of said outer housing.

15. The flow meter according to claim 14 wherein:

said first internal bore of said outer housing has an internal chamfer at a second end thereof; and said inner member has an external chamfer at a second end thereof, said external chamfer engaging said internal chamfer when said inner member is received within said outer housing first internal bore to center said second end of said inner member within said second end of said outer housing first internal bore.

16. The flow meter according to claim 15 wherein said metering structure is a wedge affixed to an inner wall of said second internal bore.

17. The flow meter according to claim 16 wherein said wedge is detachable from said inner wall.

18. The flow meter according to claim 17 wherein said wedge is positioned substantially centrally to said first and said second ends.

19. The flow meter according to claim 18 wherein said wedge includes at least one face oriented at an oblique angle to a longitudinal axis of said second bore.

20. The flow meter according to claim 19 wherein said face at least partially defines an apex to said wedge, said apex substantially lying within a plane perpendicular to said longitudinal axis.

21. The flow meter according to claim 20 wherein a height of said wedge is defined as the minimum distance from said apex to said inner wall of said second bore taken along a radial extending from said longitudinal axis to said inner wall, and wherein a ratio of said height to a diameter of said inner wall is within the range of 0.2 to 0.5.

22. The flow meter according to claim 18 wherein said first port is positioned a predefined distance from said wedge as measured along a longitudinal axis of said second bore.

23. The flow meter according to claim 22 wherein said first port comprises:

a port connection on said outer housing having a partially threaded bore in fluid communication with an interior of said outer housing;

a circular land on an exterior of said inner member, said land further defining an aperture therethrough in fluid communication with an interior of said inner member;

a hollow core bolt having a central bore therethrough, said bolt received within said partially threaded bore and a bottom portion thereof abutted to said land; and a seal, isolating said central bore from said space for transmitting fluid pressure from said second bore through said central bore.

24. The flow meter according to claim 23 wherein said inner member and said outer housing in combination define at least two ports for receiving a pressure sensing device.

25. The flow meter according to claim 24 wherein at least a first of said ports is positioned at an upstream area of said flow meter from said wedge, and at least a second of said ports is positioned at a downstream area of said flow meter.

26. The flow meter according to claim 25 wherein said first and said second ports are equally spaced along said longitudinal axis from said wedge.

27. A method for measuring the flow of a fluid through a tube, said method comprising the steps of:

providing an outer housing having an internal bore;

providing a calibrated tubular flow metering device having a flow restrictor mounted therein;

inserting the flow metering device within the outer housing internal bore in a telescoping fashion to create a cannular space between the outer housing and the metering device, equalizing the pressure of the cannular space with the internal pressure of the flow metering device;

coupling the combined outer housing and calibrated tubular flow metering device in the flow path of a fluid; and measuring the pressure differential on each side of the flow restrictor.

* * * * *